May 8, 1945.  T. E. TORKELSON  2,375,332
RECORD CONTROLLED ACCOUNTING MACHINE
Filed May 23, 1940  7 Sheets-Sheet 1

INVENTOR
Torkel E. Torkelson
BY
ATTORNEY

May 8, 1945.  T. E. TORKELSON  2,375,332
RECORD CONTROLLED ACCOUNTING MACHINE
Filed May 23, 1940  7 Sheets-Sheet 2
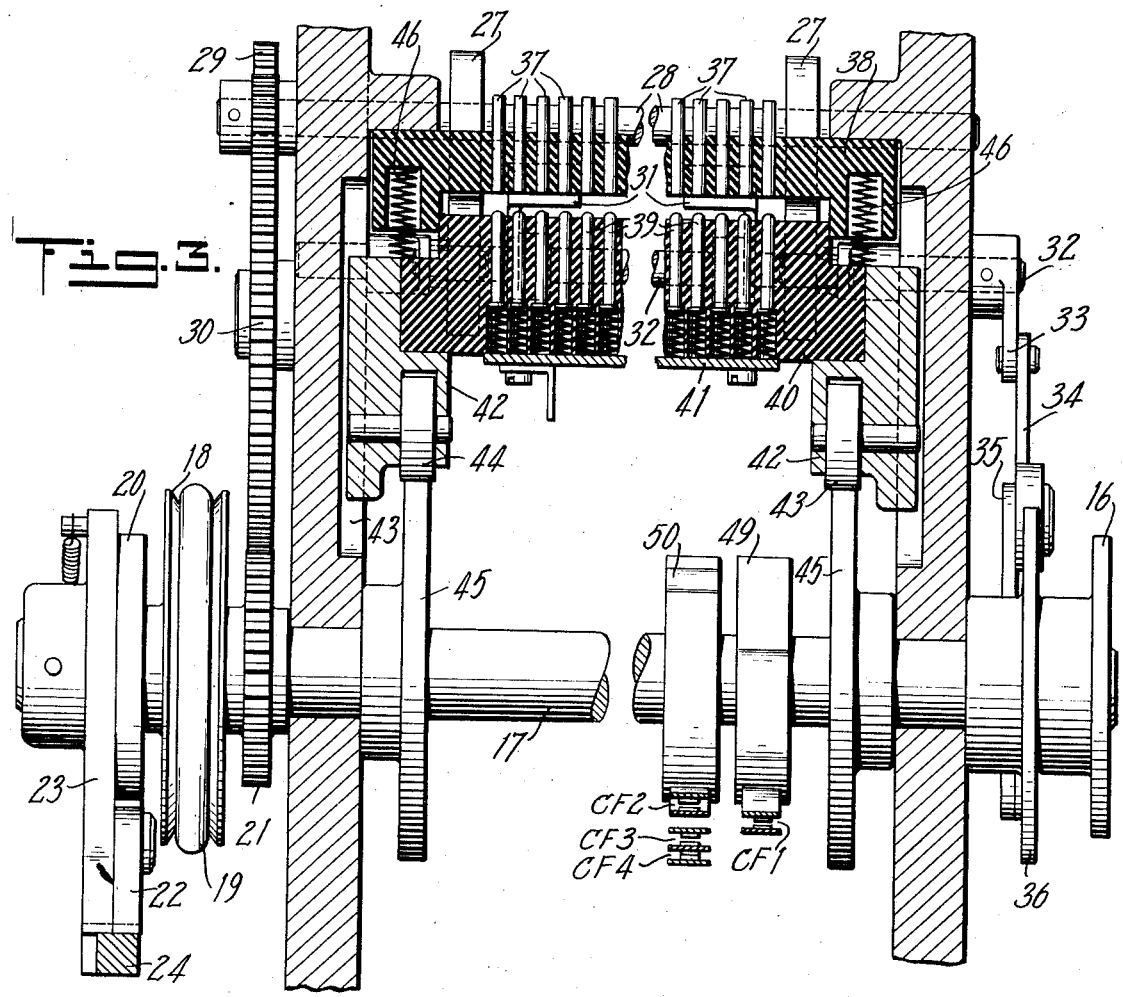
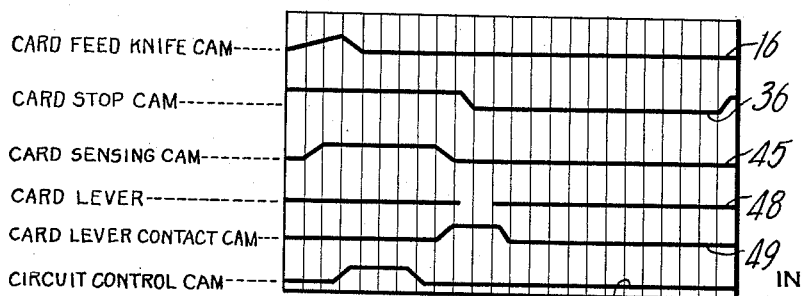

May 8, 1945. T. E. TORKELSON 2,375,332
RECORD CONTROLLED ACCOUNTING MACHINE
Filed May 23, 1940 7 Sheets-Sheet 3
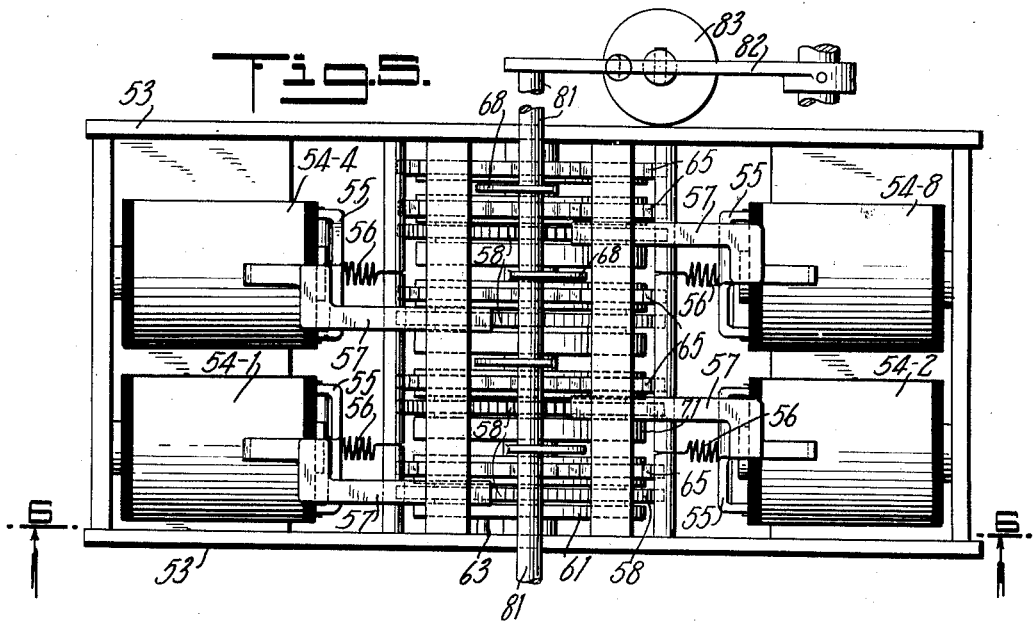
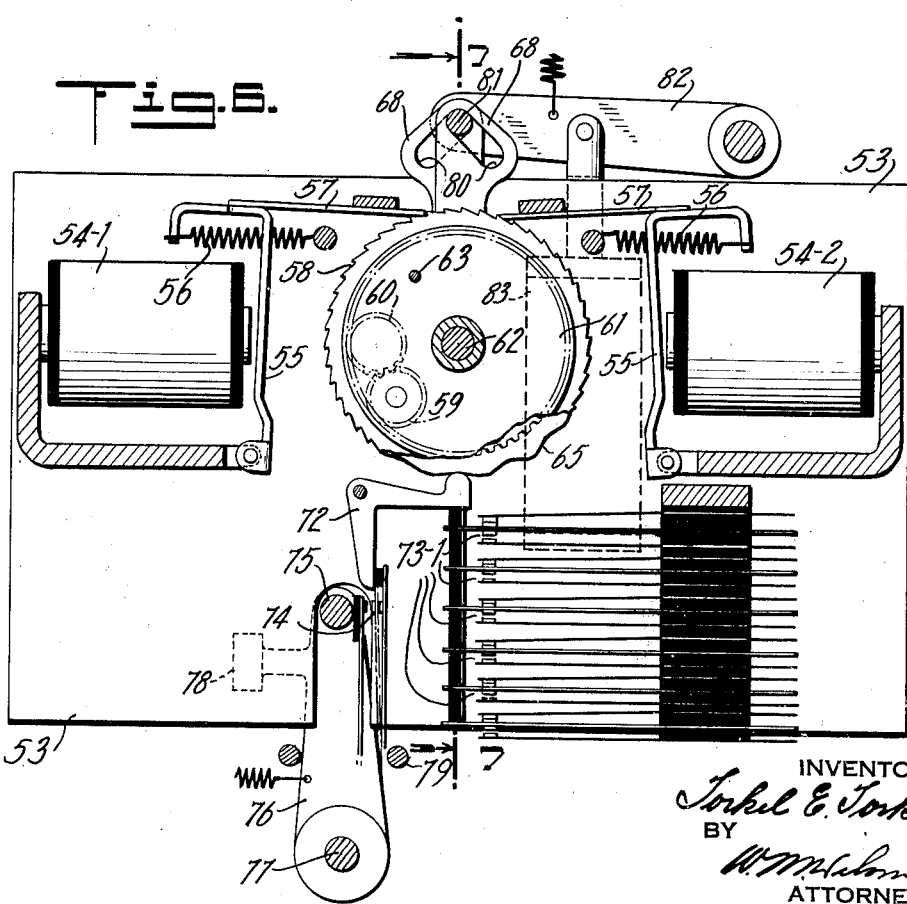
INVENTOR
Torkel E. Torkelson
BY
ATTORNEY

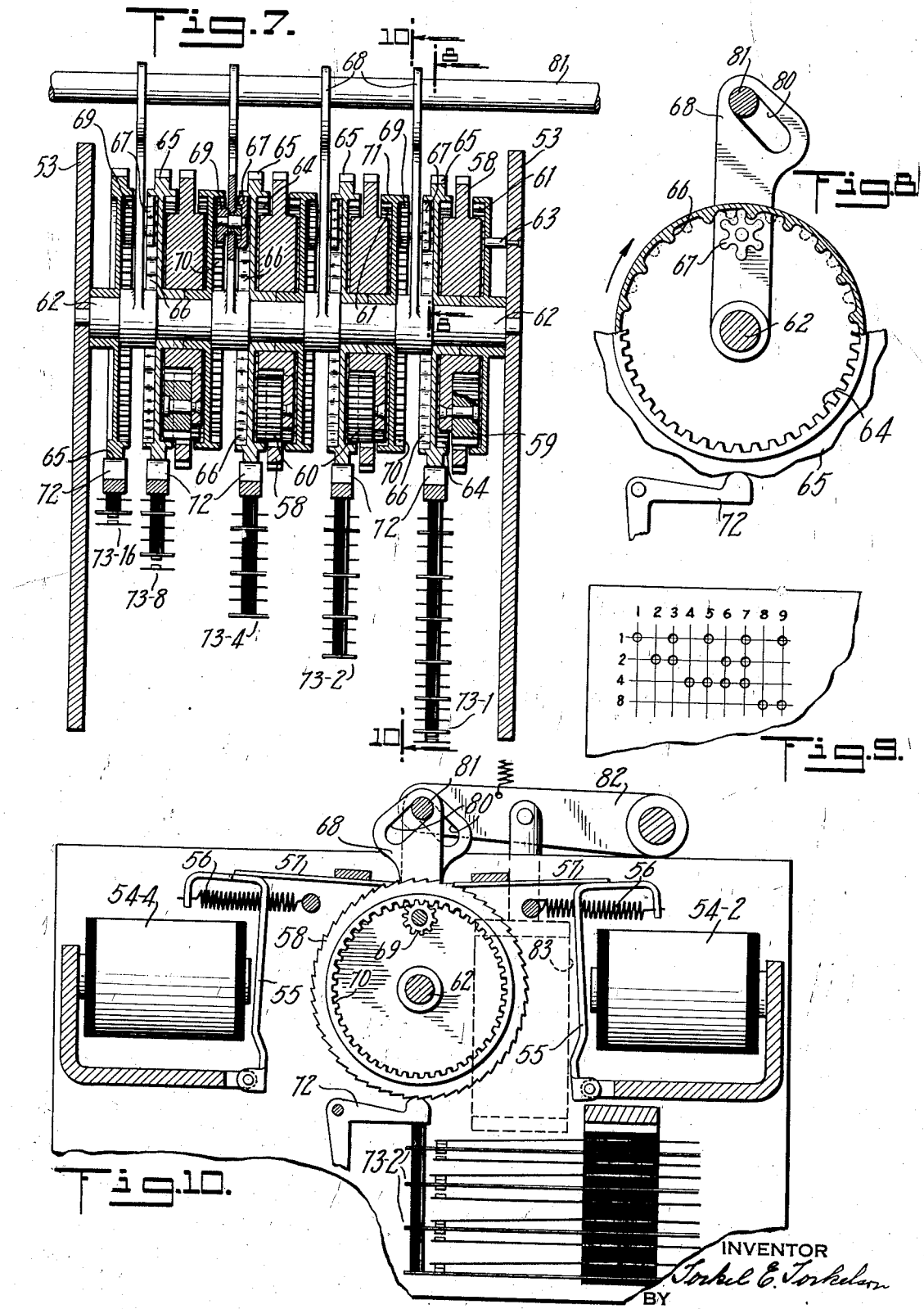

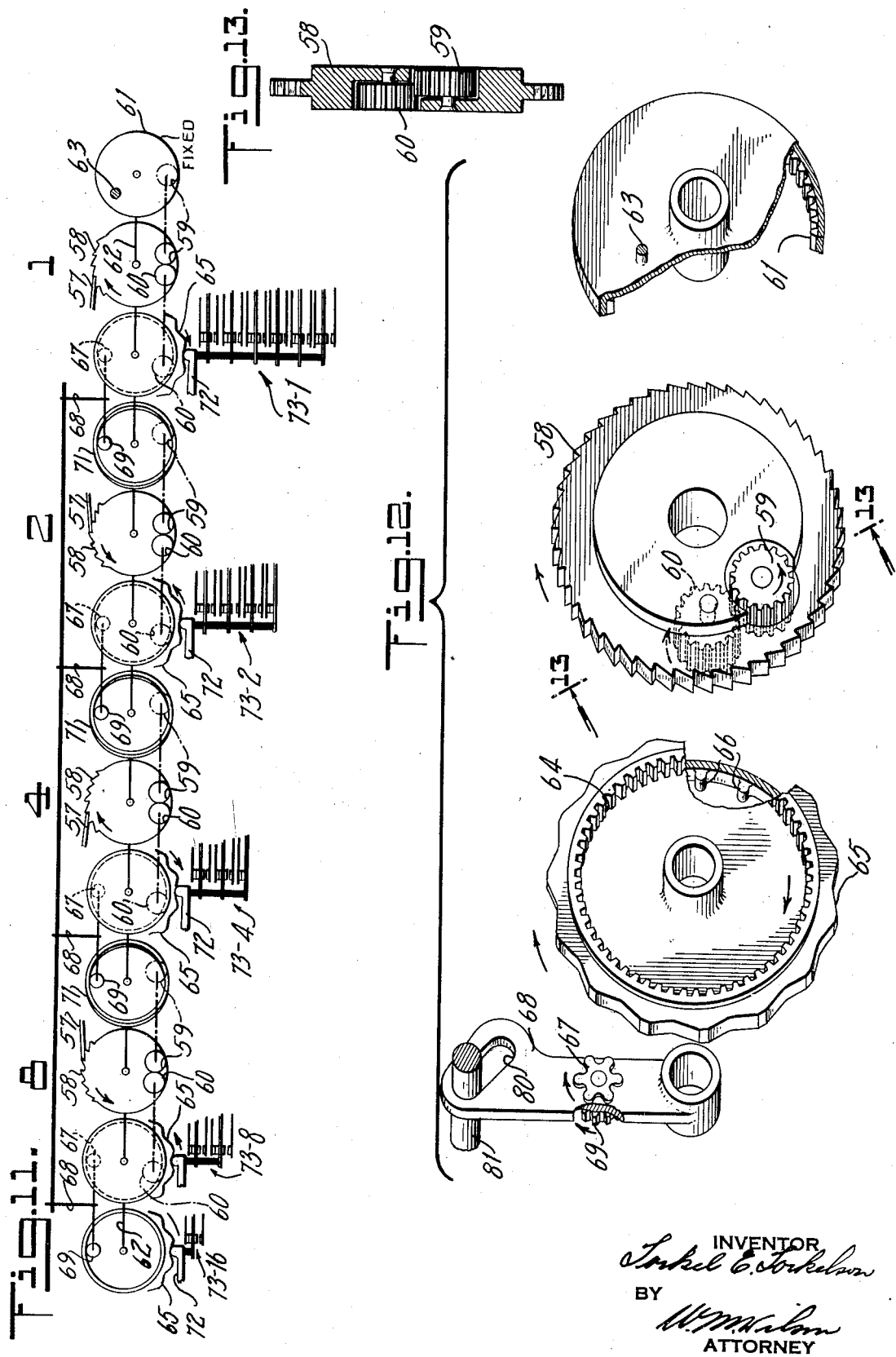

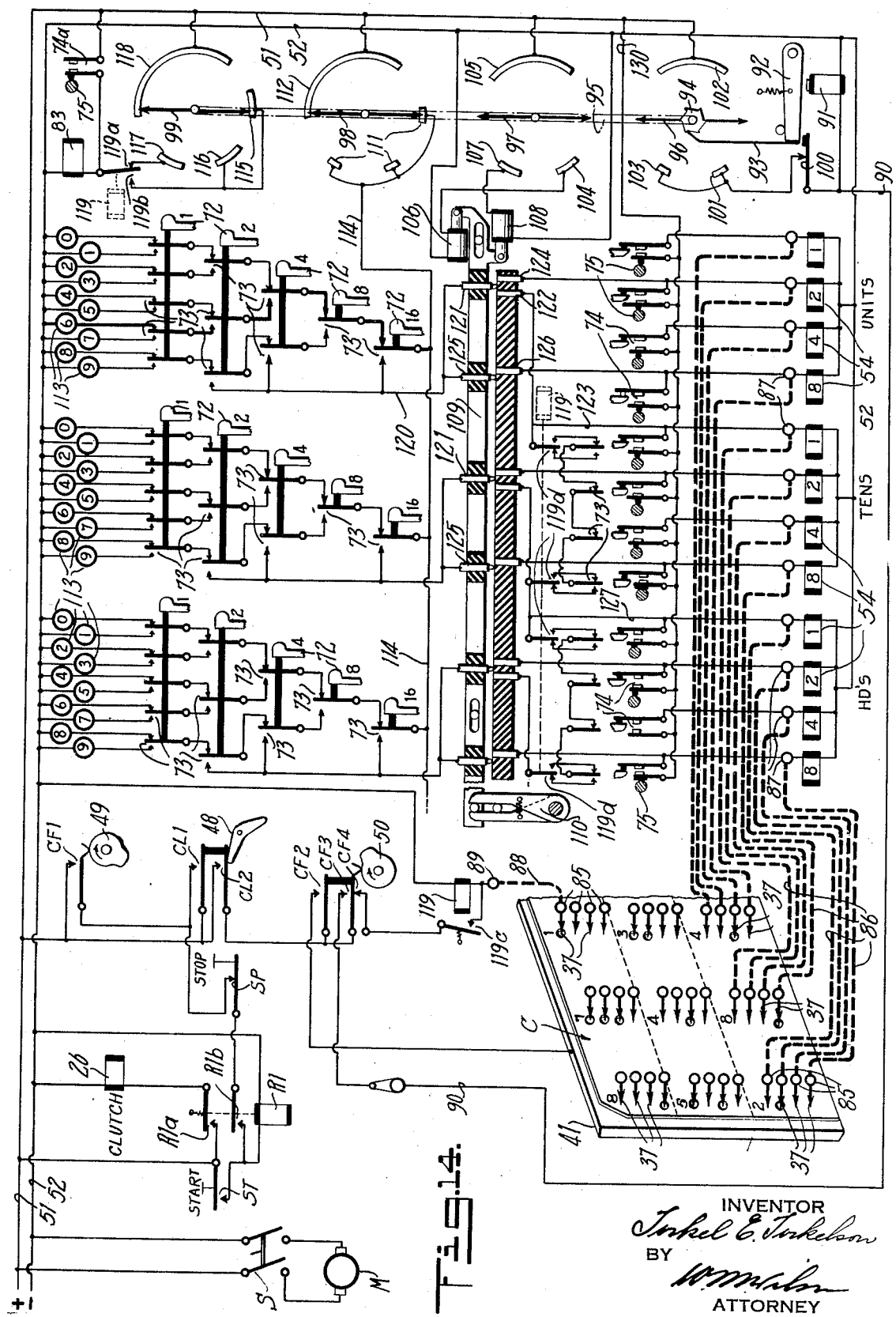

Fig. 15.

| | Hd's<br>1 6 8 4 2 1 | Tens<br>1 6 8 4 2 1 | Units<br>1 6 8 4 2 1 | "carry" | |
|---|---|---|---|---|---|
| | — — — — — | — — — — — | — — — — — | | 1 |
| ENTER +36 | — — — — — | — — — X X | — — X X — | plus | 2 |
| | — — — — — | — — — X X | — — X X — | | 3 |
| STEP 1 | — — — — — | — — — — — | — — — — — | plus | 4 |
| | — — — — — | — — — X X | — — X X — | | 5 |
| STEP 2 | — — — — — | — — — — — | — — — — — | minus | 6 |
| | — — — — — 0 | — — — X X 3 | — — X X — 6 | | 7 |
| ENTER +29 | — — — — — | — — — X — | — X — — X | plus | 8 |
| | — — — — — carry+ | — — X — X | — X X X X | | 9 |
| STEP 1 (CARRY) | — — — — — | — — — — X  carry1 | — — — — — | plus | 10 |
| | — — — — — carry+ | — — X X — | — X X X X | | 11 |
| STEP 2 (SUBT. 10) | — — — — — | — — — — — | — X — X — | minus | 12 |
| | — — — — — | — — X X — 6 | — — X — X 5 | | 13 |
| ENTER +38 | — — — — — | — — — X X | — X — — — | plus | 14 |
| | — — — — — carry+ | — — X — X  carry1 | — X X — X | | 15 |
| STEP 1 (CARRY) | — — — X  borrow1 | — — — X  carry1 | — — — — — | plus | 16 |
| | — — — X | — X — X —  carry+ | — X X — X | | 17 |
| STEP 2 (SUBT.) | — — — — — | — X — X — | — X — X — | minus | 18 |
| | — — — X 1 | — — — — — 0  carry— | — — X X 3 | | 19 |
| ENTER −26 | — — — — — | — — — X — | — — X X — | minus | 20 |
| | — — — X  carry− | X X X X — borrow1 | X X X — X | | 21 |
| STEP 1 (BORROW) | — — — X  borrow1 | — — — X  borrow1 | — — — — — | minus | 22 |
| | — — — — — carry− | X X X — X | X X X — X | | 23 |
| STEP 2 (ADD.10) | — — — — — | — X — X — | — X — X — | plus | 24 |
| | — — — — — | — — X X X 7  carry+ | — — X X X 7 | | 25 |
| ENTER −41 | — — — — — | — — X — — | — — — — X | minus | 26 |
| | — — — — — | — — — X X | — — X X — | | 27 |
| STEP 1 | — — — — — | — — — — — | — — — — — | minus | 28 |
| | — — — — — | — — — X X | — — X X — | | 29 |
| STEP 2 (ADD.10) | — — — — — | — — — — — | — — — — — | plus | 30 |
| | — — — — — | — — — X X 3 | — — X X — 6 | | 31 |

Patented May 8, 1945

2,375,332

UNITED STATES PATENT OFFICE 2,375,332

RECORD CONTROLLED ACCOUNTING MACHINE

Torkel E. Torkelson, Baldwin, N. Y., assignor to International Business Machines Corporation, New York, N. Y., a corporation of New York Application May 23, 1940, Serial No. 336,691

19 Claims. (Cl. 235—61.8)

This invention relates to record card controlled accounting machines.

The principal object is to provide an improved accumulating mechanism and controls therefor which are responsive to combinational perforations made in record card columns. Perforations in the record cards are made in accordance with the binary system of notation for the separate digits, and each denominational order of the accumulator constitutes a separate binary accumulator, in which the digits related to that order are entered as binary numbers.

A more specific object of the invention is to provide an improved decimal accumulator, each denominational order of which is a binary accumulator, and in which improved tens carry mechanism is provided between the orders.

A further object of the invention is to provide improved accumulating mechanism capable of receiving additive and subtractive amounts.

A still further object of the invention is to provide improved cancellation or resetting mechanism for a binary accumulator.

Still another object is to provide an improved subtracting mechanism for a binary accumulator.

Other objects of the invention will be pointed out in the following description and claims and illustrated in the accompanying drawings, which disclose, by way of example, the principle of the invention and the best mode, which has been contemplated, of applying that principle.

In the drawings:

Fig. 3 is a plan section taken along lines 3—3 of Fig. 1 with the view rotated 90°.

Fig. 4 is a time chart showing the timing of several of the operating cams.

Fig. 5 is a plan view of one of the binary accumulators constituting a denominational order of a decimal accumulator.

Fig. 6 is a section taken along lines 6—6 of Fig. 5.

Fig. 7 is a sectional view taken along lines 7—7 of Fig. 6.

Fig. 8 is a sectional detail taken along lines 8—8 of Fig. 7.

Fig. 9 is a view showing the coding arrangement used to represent the digits on the record cards.

Fig. 10 is a sectional view taken along lines 10—10 of Fig. 7.

Fig. 11 is a diagrammatic view showing the manner in which the several elements of the binary accumulator are geared together.

Fig. 12 is a view in expanded form showing the component parts of a binary accumulator section.

Fig. 13 is a detail taken along lines 13—13 of Fig. 12.

Fig. 14 is a wiring diagram of the electric circuits of the machine.

Fig. 15 is a table showing the successive settings of the elements of the accumulator in the handling of a problem involving addition and subtraction.

The card

Figure 1:
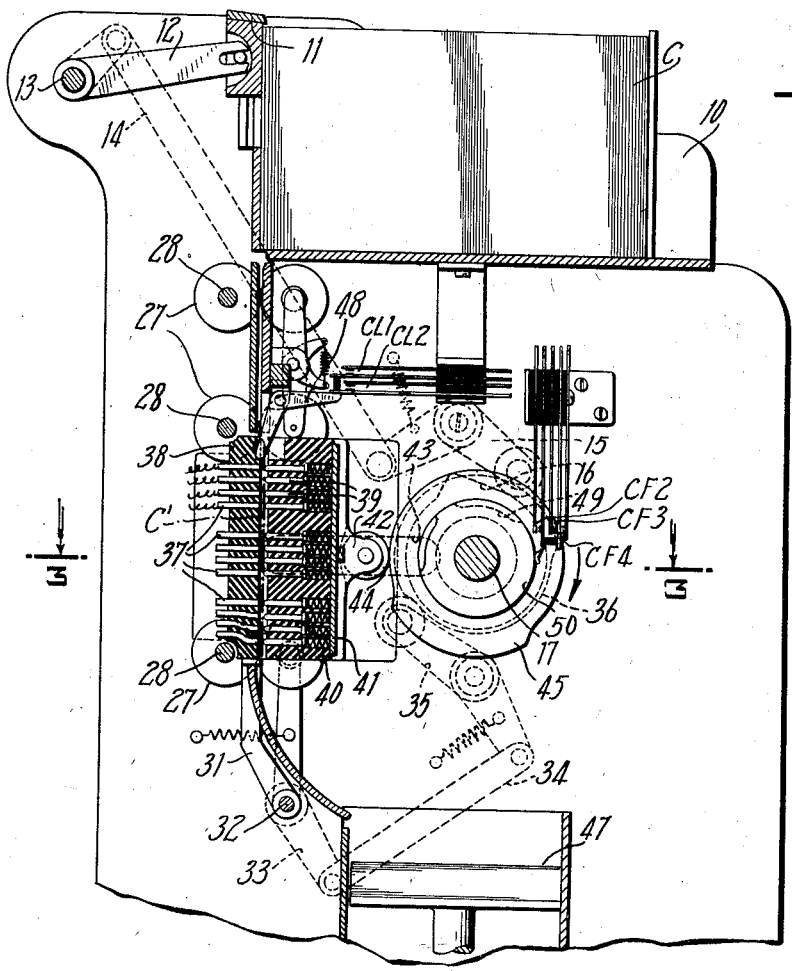
Fig. 1 is a transverse section through the card feeding and sensing mechanism of the machine.

The record cards which control the operation of the machine are the same in outline as the usual Hollerith record cards in that a plurality of data receiving columns are provided, in each of which data may be represented by perforations. In the present case each column of the card, which is designated C in Fig. 14, is subdivided vertically into three parts to provide an upper, an intermediate and a lower section of four index point positions each. In any of the four positions digits may be represented in accordance with the coding shown in Fig. 9. As noted in this figure, the four positions have assigned thereto fixed values which are the first four terms of the binary progression, that is, the uppermost position represents the value 1, the next the value 2, the third the value 4 and the last the value 8.

With this arrangement a digit 1 is represented by a perforation in the uppermost of the four positions, and a digit 9 is represented by a perforation in both the uppermost and lowermost positions with the intermediate digits represented in the manner shown in Fig. 9. In Fig. 14 the card C (which for convenience of illustration has its columns widely separated) contains perforations representing the number 871 in the upper field, 543 in the central field and 284 in the lowermost field.

Card feeding mechanism

Figure 2:
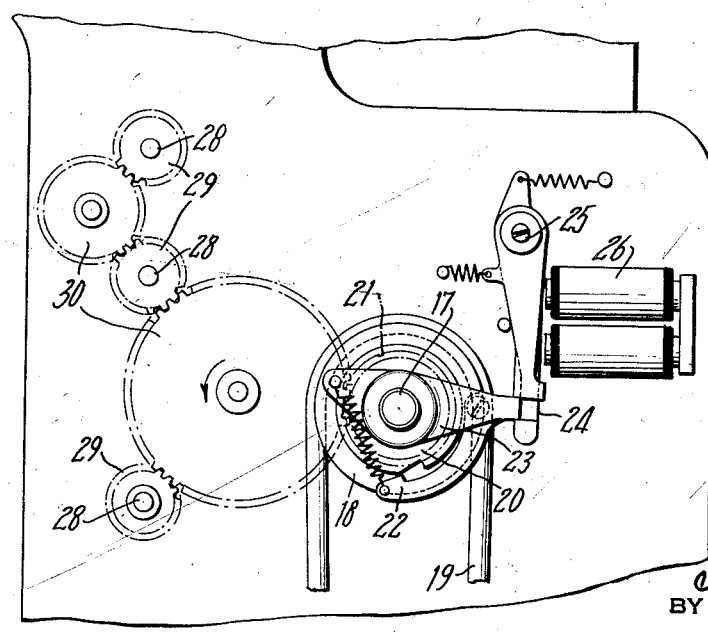
Fig. 2 is a partial outside view of the card feeding and sensing mechanism showing the drive connections thereof.

The cards C are placed in the hopper 10 (Fig. 1) from which they are advanced singly by the vertically reciprocated picker knife 11 which is suitably mounted for up and down movement. The picker has pin and slot connection with arm 12 secured to a rod 13 which in turn has arm and link connection 14 with a pivoted follower lever 15 controlled by a cam 16 secured upon shaft 17. The shaft 17 (see also Figs. 2 and 3)

has loosely mounted thereon a pulley 18, which through belt 19, is constantly driven from any suitable source of power, such as an electric motor (not shown). Integral with pulley 18 is a clutch driving disk 20 and also a gear 21. Lying in the path of the constantly rotating disk 20 is a spring-pressed dog 22 which is pivoted to an arm 23 secured on shaft 17. A latch 24 pivoted at 25 normally engages the dog 22 and arm 23 to hold them in the position shown in Fig. 2. Upon energization of clutch magnet 26, latch 24 will be rocked counterclockwise to release dog 22 for engagement in the driving notch of disk 20, whereupon shaft 17 will be rotated, and during such rotation the picker cam 16 will operate to cause advance of a record card to the first of a set of pairs of rollers 27 (Fig. 1).

The left hand roller of each pair is carried by a rod 28, at the extremity of each of which (Fig. 2) is a gear 29 which through idlers 30 are constantly driven by the gear 21 which is integral with the constantly rotated driving pulley 18. The right hand rollers of each pair are suitably mounted on supporting arms which are spring urged as shown.

The card advanced by picker 11 is moved downwardly by the rollers 27 into the broken line position designated C' where it is interrupted by a pair of arms 31 secured to a rod 32. The extremity of rod 32 has secured thereto an arm 33 (see Fig. 3) which is connected by a link 34 to pivoted follower lever 35 whose roller cooperates with a cam 36 secured to shaft 17. The timing is such that cam 36 will rock arms 31 slightly clockwise as viewed in Fig. 1 just before the card reaches the C' position, so that when the card eventually engages the upper ends of the arms, it will be restrained in such position with the lowermost driving roller 27 slipping on the surface of the card. In this position the upper edge of the card is just below the bite of the central pair of rollers 27.

*Card sensing mechanism*

When the card is in position C', it is in what may be termed the "sensing" position. The sensing mechanism comprises a plurality of contact elements 37 embedded in a fixed block of insulating material 38. In alignment with each fixed element 37 is a spring-pressed contact plunger 39 mounted in a block of insulating material 40, the springs behind each pin 39 serving to electrically connect them to a common conducting plate 41. The block 40 is provided with end pieces 42 guided for reciprocation toward and away from the card in suitable slots 43 of the framework of the machine. These end pieces carry rollers 44 which coact with cams 45 on the drive shaft 17.

Between the blocks 40 and 38 are suitable compression springs 46 serving to urge the contact elements 37 and 39 apart to provide a space into which the card is fed. When the cams 45 rotate, plungers 39 are urged against the card, and where a perforation is present in any pin position, the related plunger 39 will make electrical contact with its companion element 37. After the card has been sensed, the pins 39 are returned to their non-contacting position, the gate arms 31 are moved to release the card, and it is advanced by the lowermost pair of rollers 28 to hopper 47.

Positioned in the path of the card and rocked thereby when the card is in its C' position, is a card lever 48 which serves to hold pairs of contacts CL1 and CL2 closed from a time just before the card enters its C' position until it begins to leave. Mounted on shaft 17 are two contact cams 49 and 50. These cams control contacts which are prefixed CF indicating that they operate during card feeding. These contacts are shown diagrammatically in Fig. 14 where the contacts controlled by cam 49 are designated CF1 and those controlled by cam 50 are designated CF2, CF3 and CF4. In Fig. 4 is shown the time at which the cams 49 and 50 operate to shift their related contacts.

*Card feed control circuits*

Referring now to Fig. 14, the circuits involved in the operation of the card feeding mechanism will be explained with particular reference to the timing chart of Fig. 4. Current is supplied from a single source to main lines 51 and 52 and, when switch S is closed, motor M is in continuous operation to drive the pulley 18. Upon closure of start key contacts ST a circuit is completed through relay magnet R1. Relay magnet R1 closes its contacts R1a to energize the clutch magnet 26 whereupon the drive shaft 17 of Fig. 1 will rotate and the picker will advance the first card from the magazine 10. While the card is advancing and before it reaches the sensing position, the sensing pins are reciprocated, but, since no card is in position, this first sensing movement has no effect.

When cam contacts CF1 close, a circuit is completed from line 51, contacts CF1, stop key contacts SP, relay contacts R1b, relay R1 to line 52. This circuit is completed provided the start key contacts ST are held closed, as they must be when operations are first commenced. After the contacts CF1 close, the leading edge of the first card will engage card lever 48 to cause closure of card lever contacts CL1 which short circuit contacts CF1 and maintain the relay R1 energized until the first card is fed out from the sensing position.

As a result of maintaining relay magnet R1 energized, the clutch magnet 26 also remains energized and the machine continues into the second cycle, during the beginning of which the sensing pins are pressed against the card while the second card is advanced from the magazine. The sensing pins are withdrawn and the stop gate moved out of the path of the first card before the rollers have fed the second card up to the card lever. The speed of the feed rollers is such that the card lever 48 is engaged by a card during the period indicated on Fig. 4 and is free for the short period which coincides with the time during which the cam contacts CF1 are closed. Accordingly, as long as cards continue to feed, the circuit through relay magnet R1 will be maintained by either the contacts CF1 or CL1.

*Accumulator mechanism*

The accumulator mechanism is a combination of a decimal and binary adding mechanism. It might be termed a decimal accumulator in which each denominational order comprises a separate four-position binary accumulator. The mechanism for one such denominational order is shown in Figs. 5 to 8 and 10. This mechanism taken by itself constitutes a binary accumulator, and the mechanical structure thereof will first be pointed out and its operation under control of the sensing devices explained later.

The mechanism is contained between two side plates 53 and includes four operating magnets designated 54—1 and 54—2, 54—4 and 54—8.

The mechanisms controlled by these four magnets are similar so that explanation of one will suffice for all, and in describing the same, like reference characters are applied to similar parts in the several like sections of the accumulator. Magnet 54—1 (Fig. 6) when energized, attracts its armature 55 against spring 56, whereby a leaf spring 57 whose free end is biased downwardly will move toward the left into engagement with the next tooth of ratchet 58.

Upon deenergization of magnet 54—1, the spring 56 will return the armature and member 57 will advance ratchet 58 one tooth in a clockwise direction. Referring to Fig. 10, it will be seen that, when magnet 54—2 is energized and then deenergized, its spring 56 will advance the related ratchet 58 one step in a counterclockwise direction. Carried by each ratchet 58 is a pair of meshing differential pinions 59 and 60 (see also Figs. 12 and 13). In the section associated with magnet 54—1, the pinion 59 meshes with an internal ring gear 61 (see Fig. 7) which is mounted on cross-bar 62 and held against rotation by a pin 63 extending from one of the side plates 53. The pinion 60 meshes with an internal ring gear 64 formed in a cam wheel 65.

The unit comprising the parts 58, 59, 60, 61 and 65 constitutes a differential mechanism effective to cause the cam wheel 65 to be advanced twice the angular distance that ratchet 58 is moved. The cam wheel 65 is provided with high and low portions as shown in Fig. 6, whose spacing is twice that of the teeth of the ratchet 58, so that when the ratchet 58 is advanced one tooth, the cam 65 will move a distance measured between adjacent high and low parts of the cam. Each of the cam wheels 65 is provided with a second internal ring gear 66, of which alternate teeth are missing, thus forming a mutilated gear which meshes with a pinion 67 carried by an arm 68 normally maintained in the position shown in Fig. 8, and the pinion 67 is rotatable on the arm 68 and through a suitable bushing is secured to a pinion 69 which meshes with an internal ring gear 70 on a wheel 71.

The operation is such that, whenever the cam wheel 65 advances two steps, the mutilated gear 66 engages and turns pinion 67 which in turn through pinion 69 advances the wheel 71. Wheel 71 corresponds to the member 61 in the lower position and has a corresponding internal gear also designated 61.

In Fig. 11 the entire differential gear arrangement is shown in diagrammatic form which shows the relationship of the parts more clearly. From this figure it can be seen that each of the four ratchets 58 may be advanced step by step and through its differential 59, 60 advance its related cam wheel 65. When any wheel 65 advances two steps or multiples of two steps, it will operate the carry gears 67, 69 to advance the next wheel 71 so that its related cam wheel 65 advances one step. The fourth cam wheel 65 through its carry gears 67 and 69 controls the operation of a fifth cam wheel 65.

It is to be noted in Fig. 11 that ratchets 58 in the 1 and 4 positions are stepped clockwise and in the 2 and 8 positions they are stepped counterclockwise to effect an entry. When the 1 ratchet 58 is moved clockwise, it moves its pinion 60 bodily in the same direction which causes the related disk 65 to rotate. At the same time, pinion 60 is rotated clockwise through its engagement with pinion 59 which is constrained to roll on the fixed teeth of disk 61. This provides the differential action that causes cam disk 65 to turn twice as far as the ratchet 58.

The same action is obtained in the 2 position where, when ratchet 58 is stepped one step in a counterclockwise direction, the 2 disk 71 is constrained against clockwise rotation because it meshes with pinion 69 whose companion pinion 67 is locked against clockwise turning by a tooth 66 (see Fig. 8) on the wheel 65, which in turn is locked through pinion 60 to locked ratchet 58 in the 1 position. It is to be noted in Fig. 8 that whether the teeth 66 are in full line or dotted line position, pinion 67 is effectively blocked against clockwise rotation and thus the stepping of the 2 ratchet 58 will advance its wheel 65 differentially just as for the 1 position. In the same manner the pinion 67 in the 2 and 4 positions are locked by the related wheels 65, when entries are made in the 4 and 8 positions. Where, of course, a carry is concurrent with an entry, the lower order wheel 65 is driven to advance pinion 67 in the proper direction to add an additional unit.

In line with each cam wheel 65 is a pivoted bell crank 72 (Fig. 6) which is rocked to shift pairs of contacts which vary in number with the several positions. These contacts are designated 73 generally, and those associated with the first wheel 65 are identified as 73—1, those with the second wheel 73—2, etc. For each wheel there is also a pair of contacts 74 controlled by lever 72, so that the contact is open as shown in Fig. 6 when the bell crank is on a low portion of the cam, and when the bell crank is on a high portion of the cam the right hand blade of contacts 74 is moved part way to the dotted line position shown, without effecting complete closure of the contacts.

Contacts 74 for all positions are arranged in alignment adjacent to a universal bar 75 which is carried by arms 76 pivoted at 77. One of the arms is provided with a key stem and button 78 whereby the bar 75 may be manually shifted to a limiting stop 79, so located, that if any contact 74 is in its partially closed position, movement of the bar 75 will complete closure thereof, while if contact 74 is in its fully opened position, the movement of bar 75 will not effect closure. In other words, movement of bar 75 will completely close a half-closed contact but will not close a fully opened contact.

As explained above, the carry pinions 67, 69 are carried by arms 68 which are pivoted on the tie rod 62. Each arm 68 has an angular slot 80 in its upper end through which a universal rod 81 passes. The rod 81 is supported by arms 82, one of which is shown in Figs. 5 and 6. Connected to the arm 82 is a plunger of a solenoid 83 which, when energized, will cause the rod 81 to move downwardly and through the cam 80 rock all the arms 68 in a direction which is opposite to the direction of travel of its related cam wheel 65. This rocking of arm 68 has the effect of displacing its pinion 67 (see Fig. 8) with respect to the mutilated gear 66 and changes the carry conditions so that carry takes place during the first step of movement of the cam wheel from home position, or, stated in other words, with pinion 67 shifted, carry will take place when the cam wheel moves from a low to a high position with respect to the bell crank 72, whereas with the wheel 67 in its normal position as shown in Fig. 8 carry will take place when the wheel moves from a high to a low position. As seen in Fig. 8, when arm 68 is rocked counterclockwise, the pinion 67 and its companion pinion 69 (see Fig. 11) simply roll on their related teeth 66 and 71, respectively, without changing the initial positions of the latter since they are locked through their pinions 60 and 59 to the locked ratchets 58. This shift of the carry pinions is brought about whenever subtracting operations are to be performed, and the controlling devices for doing so will be explained hereinafter in connection with the circuit diagram. To explain the operation of entering in another way, it might be said that cam 65 has a "set" and an "unset" position and that pinion 67 has an "additive" and a "subtractive" position, and that both the cam and the pinion may be in either of their alternate positions when an entry is made. In tabular form we then have several conditions when an entry is made.

1. Cam 65 "unset"—pinion 67 in "additive" position.
2. Cam 65 "set"—pinion 67 in "additive" position.
3. Cam 65 "unset"—pinion 67 in "subtractive" position.
4. Cam 65 "set"—pinion 67 in "subtractive" position.

As a result, a carry to the next higher order will be effected or not for these conditions as follows:

1. No carry.
2. Carry.
3. Carry.
4. No carry.

Briefly summarizing the mechanical operation of the binary accumulator, whenever any of the magnets 54 is energized, its cam wheel 65 moves one step, shifting its cam from the so-called high to a low position or vice versa, and each time a wheel 65 is moved two steps it will cause the next higher wheel to advance one step. When any cam wheel is in its high position, it may be said to be in its set position or to contain an entry, and when in its low position, it may be said to be in its non-set position or to be clear. The several wheels represent the several different values in the binary series, so that an entry in the first wheel represents an entry of 1, an entry in the second wheel represents an entry of 2, and entry in the third wheel represents an entry of 4 and an entry in the fourth wheel represents an entry of 8. The fifth wheel which receives an entry only by carry represents 16. Thus, where there is an entry in more than one wheel, the total entry is represented by the sum of the individual entries.

*The problem*

Before tracing circuits in detail, the problem diagrammatically set forth in Fig. 15 will be explained to make clear the principles of operation of the binary accumulator and its utilization as a denominational order of a decimal accumulator. In Fig. 15 the three columns headed units, tens and hundreds represent three orders of a decimal accumulator. In each order there are columns headed 1, 2, 4 and 8. These four columns represent the four orders of the binary accumulator into which the digit-representing entries are made. In these columns are dashes and X's, the dash representing no entry in a particular position and an X representing an entry. Along the first line, dashes are shown in all positions indicating there are no entries in any of them. The second line represents an entry of 36 and is represented by X's in the 4 and 2 positions in the units order and by X's in the 2 and 1 positions in the tens order. The third line represents the condition in the accumulator after this entry has been made. In this case there is no change.

As will be more particularly explained in connection with the circuit diagram, for each entry the machine takes what may be termed two steps of which step 1 is a carry step and step 2 is a correcting step. Nothing takes place during these steps at this time, so that at the completion of an entry of 36 the setting of the units is as indicated on the seventh line on which the digital evaluations are indicated. To this entry there is now added the amount 29 represented by an entry in the 2 position of the tens order and entries in the 8 and 1 positions of the units order. This second entry results in the setting of the binary accumulators as indicated along line 9, where it may be noted that the setting of all four positions in the units section represents the amount 15. During the carry step, an entry in the 1 position of the tens order is made resulting in the setting as on line 11. During the step 2 the carry pinions are shifted and an entry of 10 is made subtractively as indicated on line 12, resulting in the ultimate setting as on line 13. The manner in which the entry is made is explained later under the heading "Entering 29 from the second card." The setting of 65 corresponds to the sum of 36 and 29.

On line 14, 38 is entered, so that line 15 indicates a setting of 13 in the units order and 9 in the tens order. During the carry step, the 1 is entered in both the tens and hundreds orders, resulting in line 17 Thereafter, during step 2 after the carry pinions are shifted, a 10 is entered subtractively in both the units and tens orders resulting in the setting in line 19 of 103. The manner in which this entry is made is explained later under the heading "Entering 38 from the third card."

Line 20 represents a subtractive entry of 26. In this case, the carry pinions are first shifted and the 26 then entered, resulting in the setting as indicated on line 21. During the carry step the carry pinions now remain in shifted position and the 1 entered in the tens and hundreds orders resulting in the setting as on line 23. During step 2, the 10 is now added with the carry pinions shifted to their normal position, so that line 25 represents a true addition of lines 23 and 24 showing the result 77. The manner in which this entry is made is explained later under the heading "Subtractive entry of 26 from the fourth card." On the following lines a subtractive entry of 41 is made, resulting in the setting of 36 as represented on line 31. The manner in which this entry is made is explained later under the heading "Entering 41 subtractively from the fifth card."

The foregoing outlines what might be termed the mathematical procedure involved in adding and subtracting numbers in the machine without detailed reference to the mechanism for carrying out the several steps which will now be explained in greater detail.

*Wiring diagram*

The wiring diagram of the electric circuits of the machine will now be explained with particular reference to the problem set forth in Fig. 15 to show how the various other instrumentalities are coordinated to obtain the desired result.

*Plug connections.*—In the diagram (Fig. 14) the contact elements 37 are represented diagrammatically, and each one terminates in a plug socket 85 from which plug connections generally designated 86 are made to plug sockets 87 which are wired to the adding magnets 54. The particular sockets 85 to which the plug connections are made depend on the part of the card from which adding is to be effected. Thus, in Fig. 14 the three columns of the lowermost field of card C are plug connected as shown for entry into three orders of the accumulator. Where subtracting operations are involved, a position of the card is set aside to receive a special designation which indicates that the item on the card is to be subtracted. The plug socket 85 associated with the particular card position in which the special designation is made is connected by a special plug connection 88 to a plug socket 89. These plug connections constitute the preliminary setting of the machine, and it is assumed that the accumulator is clear or in zero position with no entries therein.

*Card feeding circuits.*—The circuits for controlling the card feed clutch have already been traced and as explained, after the start key is depressed, the card feed clutch magnet 26 is energized and will remain so as long as cards continue to feed from the magazine.

*Card sensing circuits.*—When the first card arrives in the sensing position and the sensing unit is moved against the card, the cam 50 operates to shift its contacts so that a circuit is traceable from line 51, through card lever contacts CL2 which are now closed, contacts CF2 to the common plate 41, thence through the contact plungers 39 (not shown in the diagram), perforation of the card, contact elements 37, plug sockets 85, connections 86, plug sockets 87, appropriate adding magnets 54 to line 52. For the example shown in the card of Fig. 14, the circuits traced would have energized the 2 magnet 54 in the hundreds order, the 8 magnet 54 in the tens order and the 4 magnet 54 in the units order. These magnets would have retracted their ratchet operating members 57 as explained in connection with Fig. 10, so that upon opening of contacts CF2 and resultant deenergization of magnets 54, their associated cam wheels will be advanced by springs 56 to their high or set positions. For the problem shown in Fig. 15 where the first entry is 36, the setting of the cam units in the several positions will be as indicated along line 2.

*Stepping switch.*—In parallel with the entering circuits just traced, a further circuit is completed from line 51, contacts CL2, contacts CF3, wire 90, magnet 91 to line 52. The magnet 91 rocks an arm 92 whose extremity carries a pawl 93 cooperating with a ratchet 94 on a shaft 95. The parts shown diagrammatically constitute a stepping switch which advances one step or tooth of ratchet 94 for each operation of the magnet 91. On the shaft 95 are four contact arms 96, 97, 98, 99 which are normally in the vertical position shown when a card is sensed, and as just explained, magnet 91 is energized at the time of card sensing. The energization causes pawl 93 to move down into engagement with the next tooth on ratchet 94 and at the same time the arm 92 breaks a pair of contacts 100 whose function will be presently explained. When contacts CF3 again open, magnet 91 will become deenergized, whereupon the restoring spring of arm 92 will step the ratchet 94 one step, whereby the contact arm 96 will connect segment 101 with common 102. With contact 100 again closed, a circuit is traceable from line 51, common 102, contactor 96, segment 101, contacts 100, magnet 91 to line 52. The magnet 91 will thereupon move pawl 93 down and cause further stepping of the switch to connect segment 103 with common 102, upon which a similar circuit is completed to again energize magnet 91, and as a result the contact arm 96 is returned to vertical or home position. These steps of advance of the switch take place between the time one card is sensed and the next is fed into the sensing position.

As the arm 96 is advanced through the first and second step positions, the other arms 97, 98 and 99 move therewith to control other circuits as will now be explained. The arm 97 when in the first step position contacts a segment 104 so that a circuit is completed from line 51 to a common 105, arm 97, segment 104, a magnet 106 to line 52. When the arm is in the second position, contacting segment 107, a similar circuit is traceable through a magnet 108. These magnets when energized serve to move a bar 109 to the left or to the right from the position shown where it is normally held by a centralizing device generally designated 110.

The arm 98 in each of its three positions contacts with a segment 111 connecting one of them to a common 112. One of the functions of the switch arm 98 is to control the circuit to groups of indicating lamps 113 which are numbered as indicated and arranged so that the lamp illuminated corresponds to the value set in the related denominational order. The lamp selected for illumination depends on the setting of the contacts 73 which are shifted by the wheel cams under control of the bell cranks 72. Thus, for a setting of 6 in, let us say, the units order, the bell cranks 72 in the 4 and 2 positions are shifted toward the left as viewed in Fig. 14, so that a circuit is traceable from line 51, common 112, arm 98, lowermost segment 111, wire 114, right hand contacts 73, thence through the circuit emphasized by heavy lines to the 6 lamp 113 to line 52. As the arm 98 is stepped around, the lamp circuit is broken between the stepped positions and reestablished during the rest period of the arm, and the lamps 113 will indicate the values set up in the various orders.

The switch arm 98 also controls the entry of carry units into higher orders. The specific tracing of such circuits will be deferred until later, after a second entry has been made into the accumulator. For the first card there is no carry circuit completed and only the illuminating circuit traced, is effected.

The switch arm 99 in the home and first step position has no effect at this time. When in the second step position it completes a circuit from line 51 to common 118, switch arm 99, segment 117, contact 119a of the relay magnet 119, solenoid 83 to line 52. Thus, in the second step position the solenoid 83 is energized to shift the carry pinions in the binary accumulators. Such movement has no effect at the present time as the single entry does not involve any carry operation, so that after the entry has been made from the first card and the stepping switch has rotated its switch arms through 180°, the setting on the binary accumulators is as represented on line 7 of Fig. 15.

*Entering 29 from the second card.*—Upon presentation of the second card to the sensing pins, entering circuits are completed to energize the 1 and 8 magnets 54 in the units order and the 2 magnet 54 in the tens order, so that the entries in these two orders are as indicated in line 9 of Figure 15. It is to be noted that during the entry of 29 the carry pins are in their "add" or normal position. From Fig. 15 it is seen that no carries take place except from the 2 to the 4 order of the tens section, that is, the 2 order already contained an entry so that the further entry actuated the carry pinion to advance the wheel of the 4 order. As a result as indicated on line 9 of Fig. 15, the units section is set to represent 15 and the tens section is set to represent 5. As before, the energization of the adding magnets is accompanied by energization of the stepping relay magnet 91, and upon de-energization of this magnet the stepping switch is advanced to its first position in which, as explained, the magnet 106 is energized and bar 109 moves toward the left.

This is what may be termed the "carry" position of the bar and, if the setting on any of the units represents 10 or more, an impulse will be sent to the 1 magnet 54 in the next higher order. Thus, for the example chosen the setting as indicated on line 9 of Fig. 15 represents 15 in the units order, so that the contacts 73 in all four positions in which entries are made will be shifted. When the contact arm 98 engages the segment 111 during this first step position (after arm 97 has contacted segment 104 to energize magnet 106), a circuit may be traced from line 51, common 112, switch arm 98, segment 111, wire 114, right hand contact 73 of the 16 arm 72, left hand contact 73 of the 8 arm 72, left hand contact 73 of the 4 arm 72, wire 120, contact 121, contact 122, which is now in line with 121, wire 123 and the 1 magnet 54 of the tens order to line 52. This carry entry is indicated on line 10 of Fig. 15, so that as a result, the setting of the accumulator is as indicated on line 11, where the carried 1 effects a carry within the tens order as indicated with the setting of 5 changed to 6 through the action of the carry pinion between the 1 and 2 orders.

When the stepping switch now moves to the second position, a 10 is to be subtracted from the units order. This is brought about in the following manner. With the switch arm 97 in the second position the circuit through magnet 108 is completed, drawing bar 109 to the right hand position in which the contact 121 engages a contactor 124, and a second contact 125 in bar 109 engages a contactor 126. When the contact arm 98 engages the segment 111 in the second step position, the circuit to line 114 and through the contacts 73 to wire 120 is completed as before, this time extending in parallel through contacts 121 and 125, contactors 124 and 126 to the 2 and 8 magnets 54 of the units order. Just prior to the completion of the circuits, the contact arm 99 engages the contact segment 117, completing a circuit to the carry pinion shift magnet 83, so that when the magnets 54 are thereafter energized, carries will take place with the pinions in their shifted position. Thus, the entry of 10 as indicated on line 12 of Fig. 15 will be in effect a subtractive entry resulting in the setting of the several positions as represented on line 13. The next and third step of the switch will return the several contact arms to their home position in which a circuit will be traceable through the contacts 73 to illuminate the 5 lamp in the units order and the 6 lamp in the tens order.

Briefly, the procedure has been to first add the denominational digits independently as 6 and 9 in the units order and 3 and 2 in the tens order with the carry pinions in "additive" position taking care of carries within each order separately. Then, there is an order to order carry as from the units order to the 1 magnet 54 of the tens order which is determined by the setting of the units order in this case. Finally, with the carry pinions in "subtractive" position, a 10 is entered into the order (units) which effected the previous order to order carry.

*Entering 38 from the third card.*—Upon sensing of the third card containing perforations representing the positive value 38, the 2 and 1 magnets 54 in the tens order will be energized together with the 8 magnet 54 in the units order, resulting in the setting of the several sections as indicated on line 15. At this time the carry pinions are in their "additive" positions, so that carries take place as indicated from the 2 to 4 and 4 to 8 orders of the tens section, and this section represents 9 (the sum of 3 and 6), that is, with the tens order representing 6 the entry in the 2 order advanced the 2 wheel to unset position and caused the related carry pinion to advance the 4 wheel one step and, since this 4 wheel was also in set position, it in turn advanced to unset position and through its related carry pinion advanced the 8 wheel one step from its unset to set position. With the stepping switch in the first step position it may be noted that the setting of the tens order represents 9, so that we have here a carry-on-a-carry condition from the units to the tens to the hundreds order. The entry of 1 into the tens order will take place as explained above through the wire 123, and the entry of a 1 in the hundreds order will take place in the following manner. An additional contact 73 is provided for each of the four positions in the tens and hundreds orders and these are normally arranged as shown below the bar 109. In each set of four contacts 73 shown, the right hand one is shifted by the 1 arm 72, the next by the 2 arm 72, the third by the 4 arm 72 and the left hand one by the 8 arm 72 of the related order. When the 1 and 8 sections contain an entry or setting, their related contacts 73 are shifted so that a circuit is traceable from wire 123, through the left hand contacts 119d which are normally closed, through the left hand contact 73 in the 1 position, through the contacts 73 in the 2 and 4 positions, left hand contact 73 in the 8 position, left hand contact 119d, wire 127, to the 1 magnet 54 in the hundreds order. This circuit is only completed when the unit stands at 9, that is, with the 1 and 8 orders "set" and the 2 and 4 orders unset, so that the 1 and 8 contacts 73 are shifted and the 2 and 4 contacts are not shifted. Where the setting is more than 9, either or both of the 2 and 4 contacts 73 will be open to prevent completion of this carry-on-carry circuit, and an independent carry circuit through the appropriate contact 121 will be completed as for the explained carry from the units to tens order. At the completion of this first step, the entries in the several denominational orders is as represented on line 17 of Fig. 15. The second step brings about the entry of 10 in the units and tens order with the preliminary energization of magnet 83 shifting the carry pinions, so that in these two orders the entry of 10 will be subtractively effected, resulting in the ultimate setting as indicated in line 19 of Fig. 15. The entry of 10 in the tens order is due to the fact that the contacts 73 in such order provides a circuit path from the wire 114, through the contacts 121 and 125 of that order to the 2 and 8 magnets 54. This example of an entry of 38 added to a setting of 65 serves to illustrate both order to order carries with carry-on-carry within a unit and also a carry-on-carry between the several denominational units.

It may be pointed out at this time that the contacts 73 associated with the 16 lever 72 is provided for those cases where an entry into an order results in a setting greater than 15 as, for example, where the initial setting may represent 8, and an entry of 9 thereafter brings the setting to 17. In such case the circuit from wire 114 goes through the shifted contact 73 associated with the 16 lever 72 directly to the wire 120 and from there completes the carry circuit in the first step of operation and the entry of 10 during the second step.

*Subtractive entry of 26 from the fourth card.—* The amount 26 is now to be subtracted from the total 103 standing in the accumulator. Upon the sensing of the card, the special perforation is sensed by the appropriate contact 37 completing a circuit from the common contact plate 41, the special hole, contact 37, plug socket 85, plug connection 88, socket 89, relay magnet 119 to line 52. The magnet 119 closes its contacts 119c so that a holding circuit is established from line 52, magnet 119, contacts 119c, cam contacts CF4, contacts CL2 to line 51. As seen from Fig. 4, the cam 50 opens the contacts CF4 during the sensing of the card and closes contacts CF3 to energize the stepping relay magnet 91. Upon reclosure of contacts CF4 which close again before contact CF3 opens, the magnet 119 is maintained energized until the next following card is sensed. Magnet 119 closes its contacts 119b (Fig. 14) so that magnet 83 becomes energized immediately through the segment 115, and the entry of the amount 26 from the third card will take place with the carry pinions in their shifted position, the net result being as indicated on line 21. It is to be noted that all the orders in the tens section are in unset position prior to the entry of 26, so that, when the 2 wheel in the tens section advances, the carry pinion advances the 4 wheel and it in turn through its pinion advances the 8 wheel which further through its pinion advances the 16 wheel. Likewise, in the units section advance of the 4 wheel causes the 8 and in turn the 16 wheel to advance. As a result, the three orders at this time have a setting of 1-30-29, which is to be corrected to 0-7-7 in the following two steps. When the stepping switch advances to its first step position, magnet 83 is again energized and the carry entry of 1's takes place as indicated on line 22 to energize the 1 magnet 54 in both the tens and hundreds orders, as the setting in both the units and tens orders represents more than 9. This entry of 1 is made subtractively since the carry pinions are in their subtract position. If the tens section contained no entry at all at this carry time, the circuit would run from wire 120, contacts 121, 122, right hand contacts 119d (now shifted), then in series through all four contacts 73, to the next contacts 119d (also closed), wire 127 to the 1 magnet 54 of the hundreds section. This might be termed a subtractive carry-on-carry. When the stepping switch advances to the second step position, the open condition of contacts 119a prevents the normal energization of magnet 83 at this time, so that the entry of 10 which is now made in the units and tens orders as indicated on line 24 will be effected additively, that is, with the carry pinions in their normal position, the net result being as indicated on line 25 which shows an entry of 77 in the accumulator.

It is to be noted that in both the units and tens orders that the setting of 29 (line 23), when 10 is added thereto, results in a setting of 7. This is explained by the fact that each unit has only five orders 1, 2, 4, 8 and 16 and, while 29 and 10 equal 39, the next higher binary order of 32 is absent so that only the 7 part of 39 remains. Specifically, upon entry of a unit in the 8 order there is a carry to the 16 order causing this order to become unset and it in turn would carry to a 32 order but none such is present, so only the 7 part is in evidence.

*Entering 41 subtractively from the fifth card.—* A further subtractive entry is now made to illustrate the operation as represented on line 26. As before, this card has a special perforation effecting the energization of relay magnet 119 with the result that magnet 83 is energized during the entry of the 41, so that the setting is as indicated on line 27. In this case no carries are called for. During the first step there is no carry called for, so that the setting remains unchanged on line 29 and there is also no entry of 10 called for, so that there is no change made during the second step position of the switch, the net result being as shown on line 31 which shows an entry of 36 standing in the accumulator.

When the machine stops due to failure of the cards to feed or through operation of the stop key to open contacts SP, the amount standing in the accumulator will be indicated on the lamps 113 by virtue of the selective circuit connections through the various contacts 73.

Resetting of the accumulator

Resetting of the accumulator is effected by operation of the button 78 in Fig. 6 which moves the bar 75 to shift the various contacts 74, and as explained previously, those contacts associated with entry sections in which there is an entry are closed and those in which there is no entry are not closed. A further contact 74a in the upper right hand corner of Fig. 14 is closed by the bar 75 to energize the magnet 83 shifting the carry pinions. With this setting, therefore, circuits will be traced from line 51, wire 139, in parallel through all the closed contacts 74, through related magnets 54 to line 52. Such entries will simply advance the set position to unset position without effecting any carry, and as a result the accumulator is cleared.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a machine of the class described, a binary accumulator, having ordered sections, one for each of a succession of powers of two, each section comprising an element movable to a "set" and a "non-set" position, carry mechanisms between the said elements, normally arranged to cause a higher element to advance when the next lower element has advanced from its "set" to its "non-set" position, entering means for said elements, means for repeatedly operating said entry means to cause entry of a succession of amounts, means for adjusting said carry mechanisms to cause a higher element to advance when the next lower element has advanced from its "non-set" to its "set" position, and means for rendering said adjusting means selectively effective prior to any of said succession of entering operations, whereby said entry will be effected subtractively.

2. In a machine of the class described, a decimal accumulator, each denominational order unit thereof comprising four elements representing the values 1, 2, 4 and 8 in the binary series upon which the values 0 to 15 may be represented combinationally, entering means for each element of a unit, operating means for repeatedly operating said entering means concurrently, to enter a succession of amounts in the elements, carry mechanisms between the elements in each denominational order unit adjustable to effect carries additively or subtractively, said mechanism being normally in additive carry position, means effective after each entering operation and controlled by the elements of an order when their setting after an entering operation represents more than 9 for operating the entering means of the element in the next higher order corresponding to the value 1 to advance such higher order one unit, means effective after each entering operation and after said unit advance for adjusting the carry mechanisms to subtractive position, and further means controlled by the elements of an order when their setting is more than 9 and while the carry mechanisms are in subtractive position for subsequently operating the entering means of such order in accordance with the value 10, whereby the amount in such order will be diminished by 10.

3. In a machine of the class described, a decimal accumulator, each denominational order unit thereof comprising four elements representing the values 1, 2, 4 and 8 in the binary series upon which the values 0 to 15 may be represented combinationally, entering means for each element of a unit, operating means for repeatedly operating said entering means concurrently, to enter a succession of amounts in the elements, carry mechanisms between the elements in each denominational order unit, means effective after each entering operation and controlled by the elements of an order when their setting after an entering operation represents more than 9 for operating the entering means of the element in the next higher order corresponding to the value 1, to advance such higher order one unit, means including said entering means for readjusting the setting of the elements of an order to decrease the setting by 10, and further means controlled by the elements of an order when their setting is more than 9 for rendering said readjusting means effective.

4. The invention set forth in claim 1 in which resetting means is provided for the elements, including means for each element controlled thereby when the element is in "set" position, for causing the related entering means to advance the same to "non-set" position, and means for causing an operation of said carry mechanism adjusting means, said last two means being rendered effective concurrently whereby all elements in "set" position will be advanced to "non-set" position and all elements in "non-set" position will remain in such position.

5. In a binary accumulator, a plurality of ordered adding wheels, one for each of a succession of powers of two, each wheel having a "set" and a "non-set" position for representing an amount in the binary system of notation, means for each wheel for advancing the same in steps from one position to the other, carry mechanisms between the said wheels normally arranged to cause a higher ordered wheel to advance when the next lower ordered wheel is stepped from its "set" to "non-set" position, whereby operation of said advancing means will effect additive entries into the accumulator, and means for adjusting all the carry mechanisms relative to said wheels to cause a higher ordered wheel to advance when the next lower ordered wheel is stepped from its "non-set" to its "set" position, whereby subsequent operation of said advancing means will effect subtractive entries into the accumulator.

6. In a binary accumulator, a plurality of ordered elements, one for each of a succession of powers of two, each element having a "set" and a "non-set" position for representing an amount in the binary system of notation, means for each element for shifting its position from "set" to "non-set" and "non-set" to "set" position, carry mechanisms between the said elements to cause a higher ordered element to shift its position when the next lower ordered element is shifted from its "set" to "non-set" position, whereby operation of said shifting means will effect additive entries into the accumulator, and means for changing the relationship between all the carry mechanisms and said elements to cause a higher ordered element to shift its position when the next lower ordered element is shifted from its "non-set" to its "set" position, whereby subsequent operation of said advancing means will effect subtractive entries into the accumulator.

7. In a machine of the class described, a decimal accumulator, each denominational order of which constitutes a binary accumulator comprising four elements corresponding to the terms 1, 2, 4 and 8 of the binary series, entering means for each element, carry mechanisms between the elements in each order normally arranged to effect additive carries, means for adjusting said carry mechanisms to effect subtractive carries, means for effecting operation of said entering means to enter amounts into the accumulator, settable devices for each order, settable by the elements thereof to represent the amount standing in the order, separate means for each order for effecting operation of the appropriate entering means to enter a 1 into any order, further separate means for each order for effecting operation of the appropriate entering means to enter a 10 into any order, means controlled by the said settable devices for any order, rendered effective when the elements of said order represent more than 9 for causing said first named separate means to effect an entry of 1 in the next higher order, means operative after said entry of 1, for rendering the carry mechanism adjusting means effective to adjust the carry mechanism between the elements of said order to effect subtractive carries and further means controlled by the said settable devices for causing said second named separate means to effect an entry of 10 in said order while the carry mechanism thereof is adjusted for subtractive carries.

8. The invention set forth in claim 7 in which further settable devices are provided for each order, settable by the elements thereof to represent the amount standing in the order, and means controlled by said further settable devices of any order when it is set to represent 9 and when said first named separate means effects an entry of 1 in said order, to cause the separate means of the next higher order to also effect an entry of 1 into the next higher order.

9. In a machine of the class described, a decimal accumulator, each denominational order of which comprises four elements representative of the first four powers of 2, adjustable carry mechanisms between the elements in each denominational order, normally set to effect additive binary carries and adjustable to effect subtractive binary carries, entering means for each element, carry mechanism adjusting means, selectively operable control means for said adjusting means, a first control means operable to cause the entering means to enter any amount in the accumulator, a second control means for each order selectively operable to cause the entering means to enter a 1 in an order of the accumulator, a third control means for each order selectively operable to cause the entering means to enter a 10 in an order of the accumulator, means for each order, settable by the elements thereof to represent the amount standing in the order, machine controlled means for calling said first, second and third control means into action in succession, the second and third control means being normally ineffective, means for rendering the adjusting control means effective to effect subtractive carries during the operation of the first and second control means, and means controlled by the settable means of an order, when it represents more than 9 after the operation of said first control means for rendering effective the second control means in the next higher order and for rendering effective the third control means in the order representing more than 9.

10. In a machine of the class described, a decimal accumulator, each denominational order of which comprises four elements representative of the first four powers of 2, adjustable carry mechanisms between the elements in each denominational order, normally set to effect additive binary carries and adjustable to effect subtractive binary carries, entering means for each element, carry mechanism adjusting means, selectively operable control means for said adjusting means, a first control means operable to cause the entering means to enter any amount in the accumulator, a second control means for each order selectively operable to cause the entering means to enter a 1 in an order of the accumulator, a third control means for each order selectively operable to cause the entering means to enter a 10 in an order of the accumulator, means for each order, settable by the elements thereof to represent the amount standing in the order, machine controlled means for calling said first, second and third control means into action in succession, the second and third control means being normally ineffective, means for rendering the adjusting control means effective during the operation of the third control means, and means controlled by the settable means of an order when it represents more than 9 after the operation of said first control means for rendering the second control means effective in the next higher order and the third control means effective in the related order.

11. In a machine of the class described, an accumulator, each denominational order of which comprises a plurality of elements representative of a number of the lowest successive powers of 2, adjustable carry mechanism between the elements in each denominational order, normally set to effect additive binary carries and adjustably set to effect subtractive binary carries, entering means for each element, carry mechanism adjusting means, selectively operable control means for said adjusting means, a first control means operable to cause the entering means to enter any amount in the accumulator, a second control means for each order selectively operable to cause the entering means to enter a 1 in an order of the accumulator, a third control means for each order selectively operable to cause the entering means to enter a predetermined amount in an order of the accumulator, means for each order, settable by the elements thereof to represent the amount standing in the order, machine controlled means for calling said first, second and third control means into action in succession, the second and third control means being normally ineffective, means for rendering the adjusting control means effective during the operation of the first and second control means, and means controlled by the settable means of an order, when it represents more than a predetermined value after the operation of said first control means for rendering effective the second control means in the next higher order and for rendering effective the third control means in the order representing more than the predetermined amount.

12. In a machine of the class described, an accumulator, each denominational order of which comprises a plurality of elements representative of a number of the lowest successive powers of 2, adjustable carry mechanism between the elements in each denominational order, normally set to effect additive binary carries and adjustably set to effect subtractive binary carries, entering means for each element, carry mechanism adjusting means, selectively operable control means for said adjusting means, a first control means operable to cause the entering means to enter any amount in the accumulator, a second control means for each order selectively operable to cause the entering means to enter a 1 in an order of the accumulator, a third control means for each order selectively operable to cause the entering means to enter a predetermined amount in an order of the accumulator, means for each order, settable by the elements thereof to represent the amount standing in the order, machine controlled means for calling said first, second and third control means into action in succession, the second and third being normally ineffective, means for rendering the adjusting control means effective during the operation of the third control means, and means controlled by the settable means of an order when it represents more than a predetermined value after the operation of said first control means for rendering the second control means effective in the next higher order and the third control means effective in the related order.

13. The invention set forth in claim 9 in which a second settable means is provided for each order, settable by the elements thereof, to represent the amount standing in the order, and means controlled jointly by the said second settable means of any order when it represents 0 and by the second control means when it is effective to subtract a 1 in the related order for rendering the second control means effective to subtract a 1 in the next higher order.

14. The invention set forth in claim 10 in which a second settable means is provided for each order, settable by the elements thereof to represent the amount standing in the order, and means for each order controlled jointly by the said second settable means of an order when it represents 9 and by the second control means thereof when it is effective to enter a 1 in the related order for rendering the second control means in the second higher order effective to enter a 1 in the said second higher order.

15. In an electrical calculating machine, an accumulator, each denominational order of which comprises a plurality of settable accumulating elements corresponding to the values 1, 2, 4 and 8 and a carry over element corresponding to the value 16, carry mechanism between said elements, means for entering a succession of amounts into said accumulator, the digits of said amounts being entered in binary form into the accumulating elements of related orders, whereby, after two amounts have been entered, in each order the accumulating elements and the carry over elements thereof will jointly represent by their setting the sum of two digits, which sum may vary from 1 to 18, a plurality of switches for each order settable by the related elements to represent the sum standing therein, means controlled by the switches in lower orders, when their setting represents 10 or more for causing the entering means of the next higher order corresponding to the value of 1 to advance the same a digit, and further means including said entering means controlled by the switches in each order when their setting represents 10 or more for changing the setting of the accumulating elements of the same order to represent 10 less than the initial sum therein.

16. In an electrical calculating machine, an accumulator, each denominational order of which comprises a plurality of settable accumulating elements corresponding to the values 1, 2, 4 and 8 and a carry over element corresponding to the value 16, carry mechanism between said elements, said carry mechanism being normally positioned for additive carrying between elements and adjustable for subtractive carrying between elements, means for entering a succession of amounts into said accumulator, the digits of said amounts being entered in binary form into the accumulating elements of related orders, whereby, after two amounts have been entered, in each order the accumulating elements and the carry over elements thereof will jointly represent by their setting the sum of two digits, which sum may vary from 1 to 18, a plurality of switches for each order settable by the related elements to represent the sum standing therein, means controlled by the switches in lower orders, when their setting represents 10 or more for causing the entering means of the next higher order corresponding to the value of 1 to advance the same a digit, and further means including said entering means controlled by the switches in each order when their setting represents 10 or more for adjusting said carry mechanism for subtractive carrying between elements and for entering the value 10 in the same order, whereby the initial sum therein will be reduced by 10.

17. The invention set forth in claim 16 in which control means is provided for rendering the two last named means operative in succession.

18. In a machine of the class described, an accumulator order comprising a binary accumulator having a plurality of accumulating elements for the values 1, 2, 4, 8 and 16, carry mechanism controlled by said elements normally positioned to effect additive carries between elements, means for shifting said carry mechanism to effect subtractive carries between elements, entering means for the accumulating elements, means for causing said entering means to enter a succession of digits in binary form into said accumulator, means for adjusting said carry mechanism for subtraction and causing said entering means to enter a 10 into the accumulator, a normally incomplete tens carry circuit connection, means operative after each digit entry for ascertaining whether the amount in the binary accumulator is greater than 9, and means controlled thereby when the amount is greater than 9 for completing said tens carry circuit connection and for rendering said adjusting means effective to enter a digit in a higher order and reduce the amount standing in the binary accumulator by 10.

19. In a machine of the class described, a binary accumulator having ordered sections, one for each of a succession of powers of 2, each section comprising an element operable from a set to a non-set position and from a non-set to a set position, carry mechanisms between the said elements, normally arranged to cause a higher element to move from its set position to its non-set position or from its non-set to its set position, when the next lower element advances from its set to its non-set position to effect additive carries, means for selectively advancing said elements from position to position, and means for adjusting said carry mechanisms to cause a higher element to move from its set position to its non-set position or from its non-set to its set position, when the next lower element advances from its non-set to its set position to effect subtractive carries.

TORKEL E. TORKELSON.